US012574945B2

(12) United States Patent
Lei et al.

(10) Patent No.: US 12,574,945 B2
(45) Date of Patent: Mar. 10, 2026

(54) SWITCHING FROM AN ACTIVE BANDWIDTH PART TO A DEFAULT BANDWIDTH PART

(71) Applicant: QUALCOMM Incorporated, San Diego, CA (US)

(72) Inventors: Jing Lei, San Diego, CA (US); Wanshi Chen, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 378 days.

(21) Appl. No.: 17/660,202

(22) Filed: Apr. 21, 2022

(65) Prior Publication Data

US 2023/0345508 A1      Oct. 26, 2023

(51) Int. Cl.
| | |
|---|---|
| *H04W 72/51* | (2023.01) |
| *H04W 72/044* | (2023.01) |
| *H04W 72/30* | (2023.01) |
| *H04W 74/0833* | (2024.01) |
| *H04W 74/0836* | (2024.01) |

(52) U.S. Cl.
CPC ......... *H04W 72/30* (2023.01); *H04W 72/044* (2013.01); *H04W 72/51* (2023.01); *H04W 74/0833* (2013.01); *H04W 74/0836* (2024.01)

(58) Field of Classification Search
CPC ... H04W 72/30; H04W 72/044; H04W 72/51; H04W 74/0833; H04W 72/0453
See application file for complete search history.

(56) References Cited

U.S. PATENT DOCUMENTS

| | | | | |
|---|---|---|---|---|
| 10,869,312 | B2 * | 12/2020 | Babaei | H04L 1/1812 |
| 10,945,172 | B2 * | 3/2021 | Jeon | H04W 36/06 |
| 2019/0132824 | A1 * | 5/2019 | Jeon | H04L 5/00 |
| 2019/0132845 | A1 * | 5/2019 | Babaei | H04L 1/1812 |
| 2019/0166555 | A1 * | 5/2019 | Cheng | H04W 76/19 |
| 2019/0261244 | A1 * | 8/2019 | Jung | H04L 1/20 |
| 2019/0289513 | A1 * | 9/2019 | Jeon | H04W 72/0453 |
| 2019/0297514 | A1 * | 9/2019 | Pao | H04W 76/19 |
| 2020/0119898 | A1 * | 4/2020 | Orsino | H04L 5/001 |
| 2020/0136878 | A1 * | 4/2020 | Yi | H04W 72/0453 |
| 2020/0145169 | A1 * | 5/2020 | Zhou | H04W 80/02 |

(Continued)

FOREIGN PATENT DOCUMENTS

| | | |
|---|---|---|
| WO | WO-2022031824 A1 | 2/2022 |
| WO | WO-2022141563 A1 | 7/2022 |
| WO | WO-2023055631 A1 * | 4/2023 |

OTHER PUBLICATIONS

Chen et al. "Network-triggered Small Data Transmission in New Radio", U.S. Appl. No. 63/317,101, filed Mar. 7, 2022 (Year: 2022).*

(Continued)

*Primary Examiner* — Shah M Rahman
(74) *Attorney, Agent, or Firm* — Harrity & Harrity, LLP

(57) ABSTRACT

Various aspects of the present disclosure generally relate to wireless communication. In some aspects, a user equipment (UE) may receive a default bandwidth part (BWP) configuration associated with at least one default BWP. The UE may switch from an active BWP to a default BWP of the at least one default BWP. The UE may perform a wireless communication task based at least in part on the default BWP. Numerous other aspects are described.

30 Claims, 8 Drawing Sheets

400 →

Network Node 404

406 Capability report

408 Default BWP configuration

412 Switch from active BWP to default BWP

410 Detect occurrence of switch condition event

UE 402

414 Perform wireless communication task

(56) References Cited

U.S. PATENT DOCUMENTS

| | | | | |
|---|---|---|---|---|
| 2020/0236677 A1* | 7/2020 | Cui | ..................... | H04W 72/23 |
| 2020/0322116 A1 | 10/2020 | Zhou et al. | | |
| 2020/0351136 A1* | 11/2020 | Hwang | ................ | H04W 56/00 |
| 2020/0404690 A1* | 12/2020 | Lee | ........................ | H04L 5/005 |
| 2021/0076445 A1* | 3/2021 | Tsai | ................ | H04W 74/0833 |
| 2021/0337585 A1* | 10/2021 | Liu | ...................... | H04L 5/0098 |
| 2022/0046714 A1* | 2/2022 | Zhou | .................. | H04L 25/0224 |
| 2022/0303991 A1* | 9/2022 | Wu | ...................... | H04L 5/0098 |
| 2022/0418001 A1* | 12/2022 | Chien | .................. | H04W 76/18 |
| 2023/0049868 A1* | 2/2023 | Zhou | ..................... | H04L 5/0098 |
| 2023/0247614 A1* | 8/2023 | Li | ........................ | H04L 5/0012 |
| | | | | 370/329 |
| 2023/0309171 A1* | 9/2023 | Zhou | ................... | H04W 72/23 |
| 2023/0397215 A1* | 12/2023 | Shi | ................... | H04W 74/0833 |
| 2024/0015741 A1* | 1/2024 | Tsai | ................... | H04L 25/0204 |
| 2024/0032103 A1* | 1/2024 | Rastegardoost | .. | H04W 74/0833 |
| 2024/0089704 A1* | 3/2024 | Shrivastava | ...... | H04W 72/0453 |
| 2024/0163730 A1* | 5/2024 | Li | ........................ | H04W 28/20 |
| 2024/0196245 A1* | 6/2024 | Kim | ...................... | H04L 5/0048 |
| 2024/0196413 A1* | 6/2024 | Chatterjee | ............ | H04L 5/0053 |
| 2025/0193959 A1* | 6/2025 | Chen | ..................... | H04W 72/23 |

OTHER PUBLICATIONS

3GPP TS 38.321: "3rd Generation Partnership Project, Technical Specification Group Radio Access Network, NR, Medium Access Control (MAC) Protocol Specification (Release 17)", 3GPP Standard, Technical Specification, 3rd Generation Partnership Project, Mobile Competence Centre, 650, Route Des Lucioles, F-06921 Sophia-Antipolis Cedex, France, vol. RAN WG2, No. V17.0.0 (Mar. 2022), Apr. 14, 2022, pp. 1-221, XP052145972, paragraph [5.15.1].
International Search Report and Written Opinion—PCT/US2023/016092—ISA/EPO—Jun. 28, 2023.

* cited by examiner

510 Receive a default bandwidth part (BWP) configuration associated with at least one default BWP 520 Switch from an active BWP to a default BWP of the at least one default BWP 530 Perform a wireless communication task based at least in part on the default BWP

500

600

610
Transmit, to a user equipment (UE), a default bandwidth part (BWP) configuration associated with at least one default BWP 620
Perform a wireless communication task based at least in part on a default BWP of the at least one default BWP

SWITCHING FROM AN ACTIVE BANDWIDTH PART TO A DEFAULT BANDWIDTH PART

FIELD OF THE DISCLOSURE

Aspects of the present disclosure generally relate to wireless communication and to techniques and apparatuses for switching from an active bandwidth part to a default bandwidth part.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The user equipment may include memory, one or more processors coupled to the memory, and instructions stored in the memory and executable by the one or more processors. The instructions may be executable by the one or more processors to cause the user equipment to receive a default bandwidth part (BWP) configuration associated with at least one default BWP. The instructions may be executable by the one or more processors to cause the user equipment to switch from an active BWP to a default BWP of the at least one default BWP. The instructions may be executable by the one or more processors to cause the user equipment to perform a wireless communication task based at least in part on the default BWP.

Some aspects described herein relate to a network node for wireless communication. The network node may include memory, one or more processors coupled to the memory, and instructions stored in the memory and executable by the one or more processors. The instructions may be executable by the one or more processors to cause the network node to transmit, to a UE, a default BWP configuration associated with at least one default BWP. The instructions may be executable by the one or more processors to cause the network node to perform a wireless communication task based at least in part on a default BWP of the at least one default BWP.

Some aspects described herein relate to a method of wireless communication performed by a UE. The method may include receiving a default BWP configuration associated with at least one default BWP. The method may include switching from an active BWP to a default BWP of the at least one default BWP. The method may include performing a wireless communication task based at least in part on the default BWP.

Some aspects described herein relate to a method of wireless communication performed by a network node. The method may include transmitting, to a UE, a default BWP configuration associated with at least one default BWP. The method may include performing a wireless communication task based at least in part on a default BWP of the at least one default BWP.

Some aspects described herein relate to an apparatus for wireless communication. The apparatus may include means for receiving a default BWP configuration associated with at least one default BWP. The apparatus may include means for switching from an active BWP to a default BWP of the at least one default BWP. The apparatus may include means for performing a wireless communication task based at least in part on the default BWP.

Some aspects described herein relate to an apparatus for wireless communication. The apparatus may include means for transmitting, to a UE, a default BWP configuration associated with at least one default BWP. The apparatus may include means for performing a wireless communication task based at least in part on a default BWP of the at least one default BWP.

Some aspects described herein relate to a non-transitory computer-readable medium that stores one or more instructions for wireless communication by a UE. The one or more instructions, when executed by one or more processors of the UE, may cause the UE to receive a default BWP configuration associated with at least one default BWP. The one or more instructions, when executed by one or more processors of the UE, may cause the UE to switch from an active BWP to a default BWP of the at least one default BWP. The one or more instructions, when executed by one or more processors of the UE, may cause the UE to perform a wireless communication task based at least in part on the default BWP.

Some aspects described herein relate to a non-transitory computer-readable medium that stores one or more instructions for wireless communication by a network node. The one or more instructions, when executed by one or more processors of the network node, may cause the network node to transmit, to a UE, a default BWP configuration associated with at least one default BWP. The one or more instructions, when executed by one or more processors of the network node, may cause the network node to perform a wireless communication task based at least in part on a default BWP of the at least one default BWP.

Aspects generally include a method, apparatus, system, computer program product, non-transitory computer-readable medium, user equipment, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
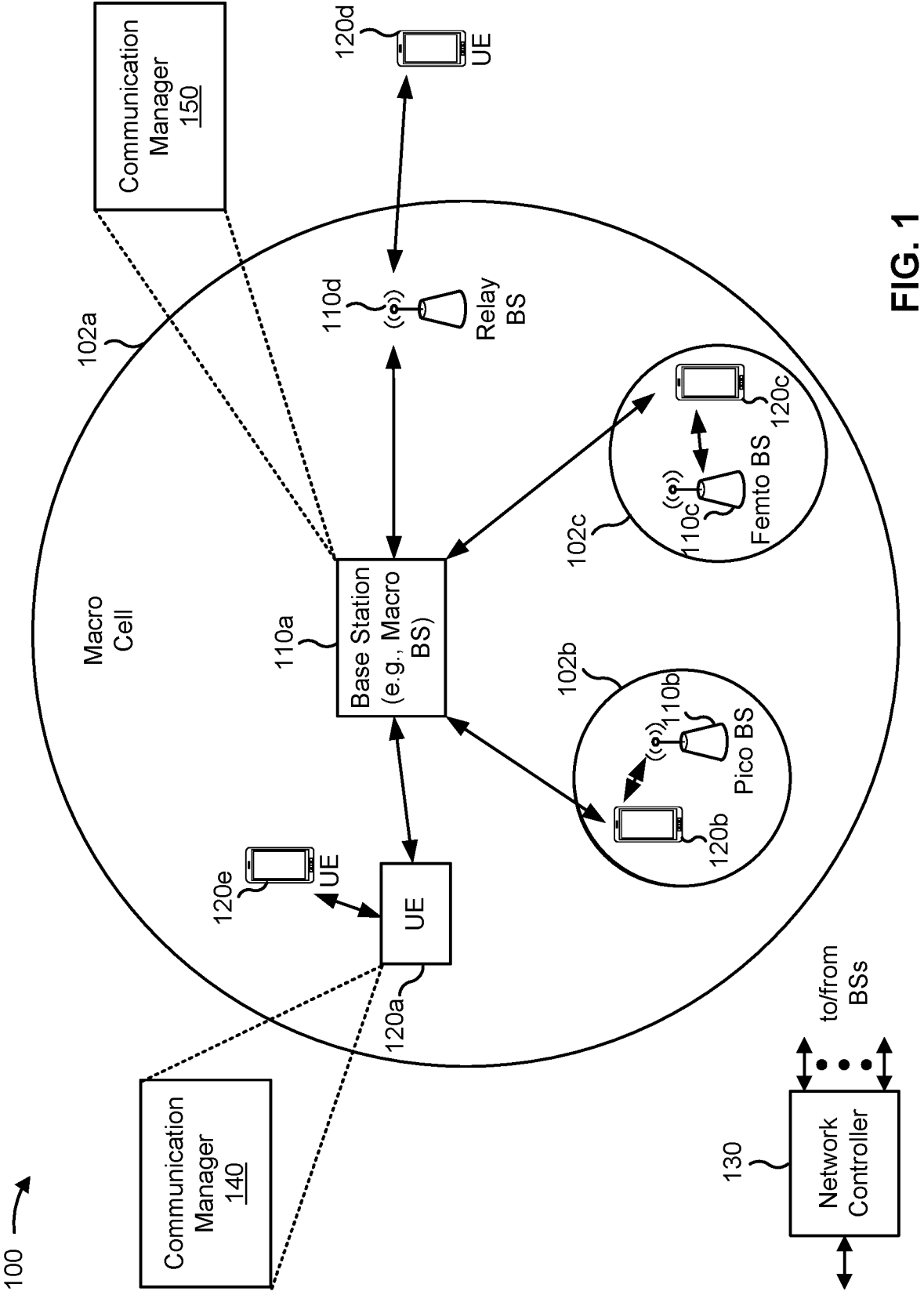
FIG. 1 is a diagram illustrating an example of a wireless network, in accordance with the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Aspects and examples generally include a method, apparatus, network node, system, computer program product, non-transitory computer-readable medium, user equipment, base station, wireless communication device, and/or processing system as described or substantially described herein with reference to and as illustrated by the drawings and specification.

This disclosure may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, are better understood from the following description when considered in connection with the accompanying figures. Each of the figures is provided for the purposes of illustration and description, and not as a definition of the limits of the claims.

While aspects are described in the present disclosure by illustration to some examples, such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component-based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). Aspects described herein may be practiced in a wide variety of devices, components, systems, distributed arrangements, and/or end-user devices of varying size, shape, and constitution.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

In some aspects, the wireless network 100 may include one or more non-terrestrial network (NTN) deployments in which a non-terrestrial wireless communication device may include a UE (referred to herein, interchangeably, as a "non-terrestrial UE"), a BS (referred to herein, interchangeably, as a "non-terrestrial BS" and "non-terrestrial base station"), a relay station (referred to herein, interchangeably, as a "non-terrestrial relay station"), and/or the like. As used herein, "NTN" may refer to a network for which access is facilitated by a non-terrestrial UE, non-terrestrial BS, a non-terrestrial relay station, and/or the like.

The wireless network 100 may include any number of non-terrestrial wireless communication devices. A non-terrestrial wireless communication device may include a satellite, a manned aircraft system, an unmanned aircraft system (UAS) platform, and/or the like. A satellite may include a low-earth orbit (LEO) satellite, a medium-earth orbit (MEO) satellite, a geostationary earth orbit (GEO) satellite, a high elliptical orbit (HEO) satellite, and/or the like. A manned aircraft system may include an airplane, helicopter, a dirigible, and/or the like. A UAS platform may include a high-altitude platform station (HAPS), and may include a balloon, a dirigible, an airplane, and/or the like. A non-terrestrial wireless communication device may be part of an NTN that is separate from the wireless network 100. Alternatively, an NTN may be part of the wireless network 100. Satellites may communicate directly and/or indirectly with other entities in wireless network 100 using satellite communication. The other entities may include UEs (e.g., terrestrial UEs and/or non-terrestrial UEs), other satellites in the one or more NTN deployments, other types of BSs (e.g., stationary and/or ground-based BSs), relay stations, one or more components and/or devices included in a core network of wireless network 100, and/or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As described herein, a network node, which also may be referred to as a "node" or a "wireless node," may be a base station (e.g., base station 110), a UE (e.g., UE 120), a relay device, a network controller, an apparatus, a device, a computing system, one or more components of any of these, and/or another processing entity configured to perform one or more aspects of the techniques described herein. For example, a network node may be a UE. As another example, a network node may be a base station. A network node may be an aggregated base station and/or one or more components of a disaggregated base station. As an example, a first network node may be configured to communicate with a second network node or a third network node. The adjectives "first," "second," "third," and so on are used for contextual distinction between two or more of the modified noun in connection with a discussion and are not meant to be absolute modifiers that apply only to a certain respective node throughout the entire document. For example, a network node may be referred to as a "first network node" in connection with one discussion and may be referred to as a "second network node" in connection with another discussion, or vice versa. Reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE being configured to receive information from a base station also discloses a first network node being configured to receive information from a second network node, "first network node" may refer to a first UE, a first base station, a first apparatus, a first device, a first computing system, a first one or more components, a first processing entity, or the like configured to receive the information from the second network; and "second network node" may refer to a second UE, a second base station, a second apparatus, a second device, a second computing system, a second one or more components, a second processing entity, or the like.

In some aspects, a UE 120 may include a communication manager 140. As described in more detail elsewhere herein, the communication manager 140 may receive a default bandwidth part (BWP) configuration associated with at least one default BWP; switch from an active BWP to a default BWP of the at least one default BWP; and perform a wireless communication task based at least in part on the default BWP. Additionally, or alternatively, the communication manager 140 may perform one or more other operations described herein.

In some aspects, a network node may include a communication manager 150. As described in more detail elsewhere herein, the communication manager 150 may transmit, to a UE, a default BWP configuration associated with at least one default BWP; and perform a wireless communication task based at least in part on a default BWP of the at least one default BWP. Additionally, or alternatively, the communication manager 150 may perform one or more other operations described herein.

As indicated above, FIG. 1 is provided as an example. Other examples may differ from what is described with regard to FIG. 1.

Figure 2:
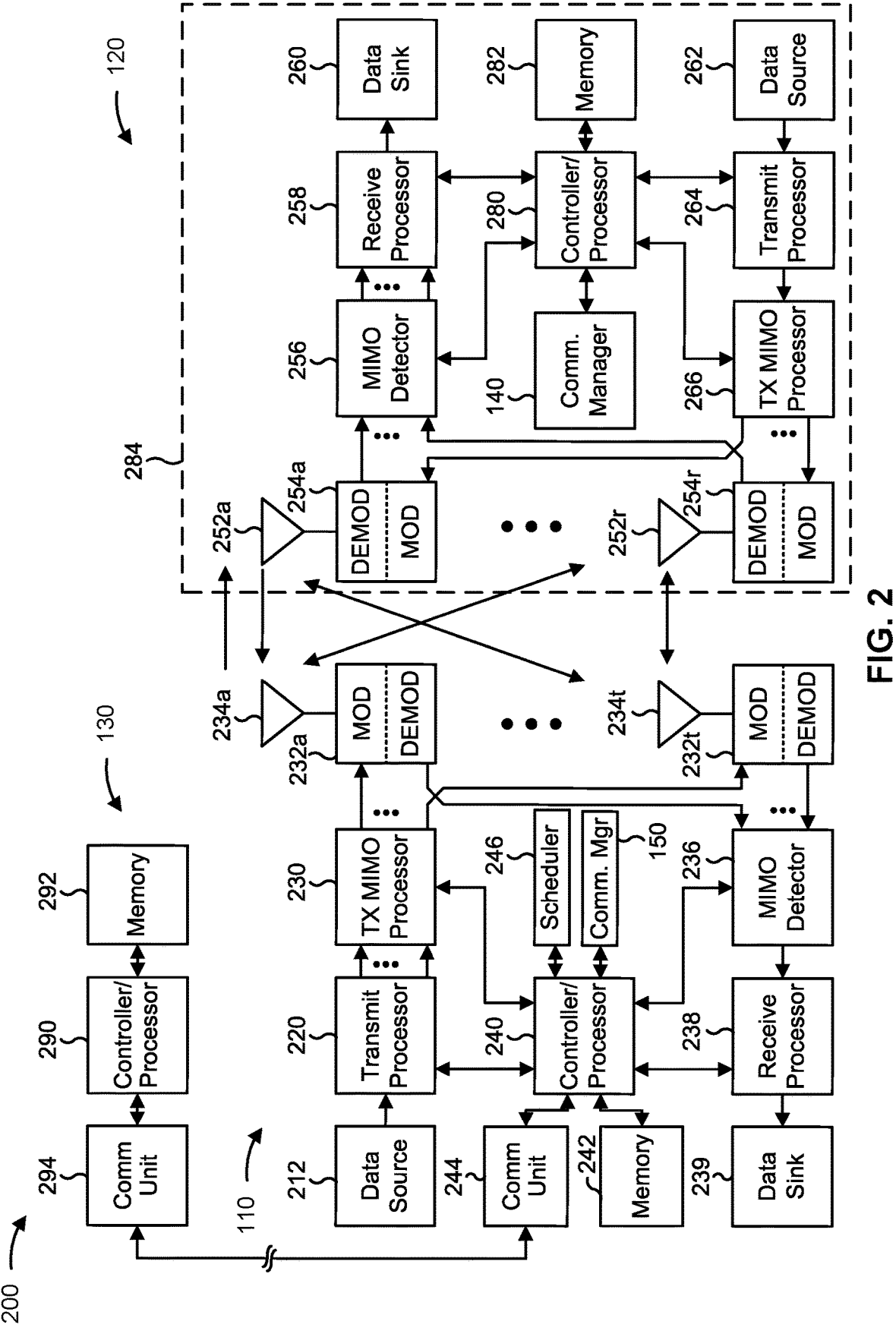
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

In some aspects, the term "base station" (e.g., the base station 110), "network node," or "network entity" may refer to an aggregated base station, a disaggregated base station, an integrated access and backhaul (IAB) node, a relay node, and/or one or more components thereof. For example, in some aspects, "base station," "network node," or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station," "network node," or "network entity" may refer to one device configured to perform one or more functions, such as those described herein in connection with the base station 110. In some aspects, the term "base station," "network node," or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station," "network node," or "network entity" may refer to any one or more of those different devices. In some aspects, the term "base station," "network node," or "network entity" may refer to one or more virtual base stations and/or one or more virtual base station functions. For example, in some aspects, two or more base station functions may be instantiated on a single device. In some aspects, the term "base station," "network node," or "network entity" may refer to one of the base station functions and not another. In this way, a single device may include more than one base station.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

Each of the antenna elements may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, or other types of antennas arranged in a linear pattern, a two-dimensional pattern, or another pattern. A spacing between antenna elements may be such that signals with a desired wavelength transmitted separately by the antenna elements may interact or interfere (e.g., to form a desired beam). For example, given an expected range of wavelengths or frequencies, the spacing may provide a quarter wavelength, half wavelength, or other fraction of a wavelength of spacing between neighboring antenna elements to allow for interaction or interference of signals transmitted by the separate antenna elements within that expected range.

Antenna elements and/or sub-elements may be used to generate beams. "Beam" may refer to a directional transmission such as a wireless signal that is transmitted in a direction of a receiving device. A beam may include a directional signal, a direction associated with a signal, a set of directional resources associated with a signal (e.g., angle of arrival, horizontal direction, vertical direction), and/or a set of parameters that indicate one or more aspects of a directional signal, a direction associated with a signal, and/or a set of directional resources associated with a signal.

As indicated above, antenna elements and/or sub-elements may be used to generate beams. For example, antenna elements may be individually selected or deselected for transmission of a signal (or signals) by controlling an amplitude of one or more corresponding amplifiers. Beamforming includes generation of a beam using multiple signals on different antenna elements, where one or more, or all, of the multiple signals are shifted in phase relative to each other. The formed beam may carry physical or higher layer reference signals or information. As each signal of the multiple signals is radiated from a respective antenna element, the radiated signals interact, interfere (constructive and destructive interference), and amplify each other to form a resulting beam. The shape (such as the amplitude, width, and/or presence of side lobes) and the direction (such as an angle of the beam relative to a surface of an antenna array) can be dynamically controlled by modifying the phase shifts or phase offsets of the multiple signals relative to each other.

Beamforming may be used for communications between a UE and a base station, such as for millimeter wave communications and/or the like. In such a case, the base station may provide the UE with a configuration of transmission configuration indicator (TCI) states that respectively indicate beams that may be used by the UE, such as for receiving a physical downlink shared channel (PDSCH). The base station may indicate an activated TCI state to the UE, which the UE may use to select a beam for receiving the PDSCH.

A beam indication may be, or include, a TCI state information element, a beam identifier (ID), spatial relation information, a TCI state ID, a closed loop index, a panel ID, a TRP ID, and/or a sounding reference signal (SRS) set ID, among other examples. A TCI state information element (referred to as a TCI state herein) may indicate information associated with a beam such as a downlink beam. For example, the TCI state information element may indicate a TCI state identification (e.g., a tci-StateID), a quasi-co-location (QCL) type (e.g., a qcl-Type1, qcl-Type2, qcl-TypeA, qcl-TypeB, qcl-TypeC, qcl-TypeD, and/or the like), a cell identification (e.g., a ServCellIndex), a bandwidth part identification (bwp-Id), a reference signal identification such as a CSI-RS (e.g., an NZP-CSI-RS-ResourceId, an SSB-Index, and/or the like), and/or the like. Spatial relation information may similarly indicate information associated with an uplink beam.

The beam indication may be a joint or separate downlink (DL)/uplink (UL) beam indication in a unified TCI framework. In some cases, the network may support layer 1 (L1)-based beam indication using at least UE-specific (unicast) downlink control information (DCI) to indicate joint or separate DL/UL beam indications from active TCI states. In some cases, existing DCI formats 1_1 and/or 1_2 may be reused for beam indication. The network may include a support mechanism for a UE to acknowledge successful decoding of a beam indication. For example, the acknowledgment/negative acknowledgment (ACK/NACK) of the PDSCH scheduled by the DCI carrying the beam indication may be also used as an ACK for the DCI.

Beam indications may be provided for carrier aggregation (CA) scenarios. In a unified TCI framework, information the network may support common TCI state ID update and activation to provide common QCL and/or common UL transmission spatial filter or filters across a set of configured component carriers (CCs). This type of beam indication may apply to intra-band CA, as well as to joint DL/UL and separate DL/UL beam indications. The common TCI state ID may imply that one reference signal (RS) determined according to the TCI state(s) indicated by a common TCI state ID is used to provide QCL Type-D indication and to determine UL transmission spatial filters across the set of configured CCs.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-8).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-8).

The controller/processor 240 of the base station 110, the controller/processor 280 of the UE 120, and/or any other component(s) of FIG. 2 may perform one or more techniques associated with switching from an active BWP to a default BWP, as described in more detail elsewhere herein. In some aspects, the network node described herein is the base station 110, is included in the base station 110, or includes one or more components of the base station 110 shown in FIG. 2. For example, the controller/processor 240 of the base station 110, the controller/processor 280 of the UE 120, and/or any other component(s) of FIG. 2 may perform or direct operations of, for example, process 500 of FIG. 5, process 600 of FIG. 6, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some examples, executing instructions may include running the instructions, converting the instructions, compiling the instructions, and/or interpreting the instructions, among other examples.

In some aspects, a UE includes means for receiving a default BWP configuration associated with at least one default BWP; means for switching from an active BWP to a default BWP of the at least one default BWP; and/or means for performing a wireless communication task based at least in part on the default BWP. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node includes means for transmitting, to a UE, a default BWP configuration associated with at least one default BWP; and/or means for performing a wireless communication task based at least in part on a default BWP of the at least one default BWP. In some aspects, the means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
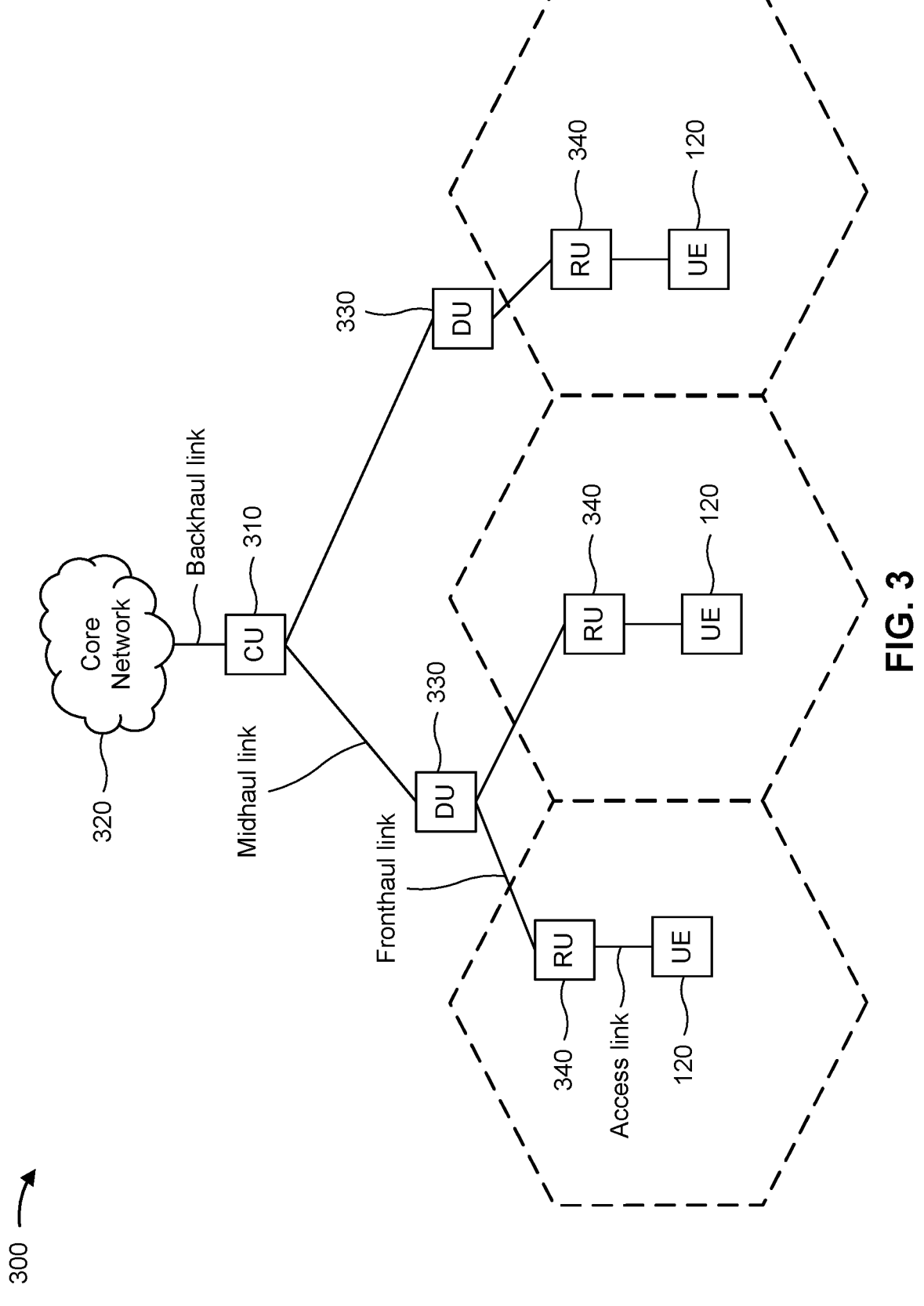
FIG. 3 is a diagram illustrating an example of open radio network access communications, in accordance with the present disclosure.

FIG. 3 is a diagram illustrating an example 300 of an O-RAN architecture, in accordance with the present disclosure. As shown in FIG. 3, the O-RAN architecture may include a CU 310 that communicates with a core network 320 via a backhaul link. Furthermore, the CU 310 may communicate with one or more DUs 330 via respective midhaul links. The DUs 330 may each communicate with one or more RUs 340 via respective fronthaul links, and the RUs 340 may each communicate with respective UEs 120 via RF access links. The DUs 330 and the RUs 340 may also be referred to as O-RAN DUs (O-DUs) 330 and O-RAN RUs (O-RUs) 340, respectively.

In some aspects, the DUs 330 and the RUs 340 may be implemented according to a functional split architecture in which functionality of a base station 110 (e.g., an eNB or a gNB) is provided by a DU 330 and one or more RUs 340 that communicate over a fronthaul link. Accordingly, as described herein, a base station 110 may include a DU 330 and one or more RUs 340 that may be co-located or geographically distributed. In some aspects, the DU 330 and the associated RU(s) 340 may communicate via a fronthaul link to exchange real-time control plane information via a lower layer split (LLS) control plane (LLS-C) interface, to exchange non-real-time management information via an LLS management plane (LLS-M) interface, and/or to exchange user plane information via an LLS user plane (LLS-U) interface.

Accordingly, the DU 330 may correspond to a logical unit that includes one or more base station functions to control the operation of one or more RUs 340. For example, in some aspects, the DU 330 may host a radio link control (RLC) layer, a medium access control (MAC) layer, and one or more high physical (PHY) layers (e.g., forward error correction (FEC) encoding and decoding, scrambling, and/or modulation and demodulation) based at least in part on a lower layer functional split. Higher layer control functions, such as a packet data convergence protocol (PDCP), radio resource control (RRC), and/or service data adaptation protocol (SDAP), may be hosted by the CU 310. The RU(s) 340 controlled by a DU 330 may correspond to logical nodes that host RF processing functions and low-PHY layer functions (e.g., fast Fourier transform (FFT), inverse FFT (iFFT), digital beamforming, and/or physical random access channel (PRACH) extraction and filtering) based at least in part on the lower layer functional split. Accordingly, in an O-RAN architecture, the RU(s) 340 handle all over the air (OTA) communication with a UE 120, and real-time and non-real-time aspects of control and user plane communication with the RU(s) 340 are controlled by the corresponding DU 330, which enables the DU(s) 330 and the CU 310 to be implemented in a cloud-based RAN architecture.

As indicated above, FIG. 3 is provided as an example. Other examples may differ from what is described with regard to FIG. 3.

In some cases, a network node can provide a default BWP among configured downlink BWPs on a primary cell and/or a secondary cell. In some cases, a network node can serve different UEs of different categories and/or different UEs that support different capabilities. For example, the network node can serve a first category of UEs that have a less advanced capability (e.g., a lower capability and/or a reduced capability) and a second category of UEs that have a more advanced capability (e.g., a higher capability). A UE of the first category can have a reduced feature set compared to UEs of the second category and can be referred to as a reduced-capability (RedCap) UE (which may be interchangeably referred to as a reduced-capacity UE, also having the acronym "RedCap"), a low tier UE, and/or an NR-Lite UE, among other examples. For example, a UE of the second category can be an ultra-reliable low-latency communication (URLLC) device and/or an enhanced mobile broadband (eMBB) device and can have an advanced feature set compared to RedCap UEs. RedCap UEs can include wearable devices, IoT devices, sensors, cameras, and/or the like that are associated with a limited bandwidth, power capacity, and/or transmission range, among other examples. A UE of the second category can be referred to as a baseline UE, a high tier UE, an NR UE, and/or a premium UE, among other examples. In some aspects, a RedCap UE can have capabilities that satisfy requirements of a first wireless communication standard but not a second wireless communication standard, while a UE of the second category can have capabilities that satisfy requirements of the second wireless communication standard (and also the first wireless communication standard, in some cases).

For example, a RedCap UE of the first category can support a lower maximum MCS than a UE of the second category (e.g., quadrature phase shift keying (QPSK) or the like as compared to 256-quadrature amplitude modulation (QAM) or the like), can support a lower maximum transmit power than a UE of the second category, can have a less advanced beamforming capability than a UE of the second category (e.g., may not be capable of forming as many beams as a UE of the second category), can require a longer processing time than a UE of the second category, can include less hardware than a UE of the second category (e.g., fewer antennas, fewer transmit antennas, and/or fewer receive antennas), and/or can be not capable of communicating on as wide of a maximum BWP as a UE of the second category, among other examples. A BWP, control channel, search space set, and/or bandwidth or other feature that is specific to, or otherwise dedicated for use with or by, a RedCap UE can be referred to as "RedCap-specific." A BWP, control channel, search space set, and/or bandwidth or other feature that is specific to, otherwise dedicated for use with or by, a non-RedCap UE, and/or is not RedCap-specific, can be referred to as "Non-RedCap-specific."

In some cases, small data transmission (SDT) communications can be supported by UEs within active BWPs and/or default BWPs. For example, both 2-step and 4-step random access channel (RACH) procedures can be applied to random access (RA)-SDT in RRC inactive modes. A UE can re-establish at least the SDT PDCP and resume the SDT resource blocks (RBs) that are configured for small data. In a subsequent data transmission (after successful contention resolution), a UE can monitor dynamic grant (DG) by cell-radio network temporary identifier (C-RNTI) in a separate common search space (CSS) (if configured) in RA-SDT. An RRC release message can be sent at the end to terminate the SDT procedure from the RRC perspective. The configuration of configured grant (CG) resources for UE uplink SDT can be contained in the RRC release message. The RRC release message also can be used to reconfigure or release the CG-SDT resources while a UE is in an RRC inactive mode.

The configuration of CG resources can include one type 1 CG configuration. Multiple CG-SDT configurations per carrier in RRC inactive mode can be supported by network configuration. For CG-SDT, the subsequent data transmission can use the CG resources for new data transmission or DG for retransmission. For RedCap UEs, RedCap-specific initial or active BWPs cannot include synchronization signal block (SSB) and/or CSS for system information and paging. Additionally, in some cases, a UE can be configured to use only an active BWP or a default BWP, but not be configured to switch from the active BWP to the default BWP.

In some cases, idle mode and/or inactive mode procedures (e.g., initial access, paging, synchronization, and/or system information broadcasting, among other examples) can be performed by a network node and a UE in an initial downlink BWP. In some cases, because a RedCap UE may not have the capability to receive transmissions across the entire initial downlink BWP, the UE can miss communications, which can affect the ability of the UE to perform idle mode and/or inactive mode procedures, thereby negatively impacting network and/or device performance.

Aspects of techniques and apparatuses described herein facilitate providing for switching from an active BWP to a default BWP. In some aspects, a UE may receive a default BWP configuration associated with at least one default BWP. The UE may switch from an active BWP to a default BWP of the at least one default BWP and perform a wireless communication task based at least in part on the default BWP. Aspects may enable, for example, co-existence of different UE types on a same cell, service continuity during BWP switching, UE complexity reduction, and reduction of signaling overhead. Accordingly, some aspects of the disclosure may facilitate improving network efficiency, thereby having a positive impact on network and/or device performance.

Figure 4:
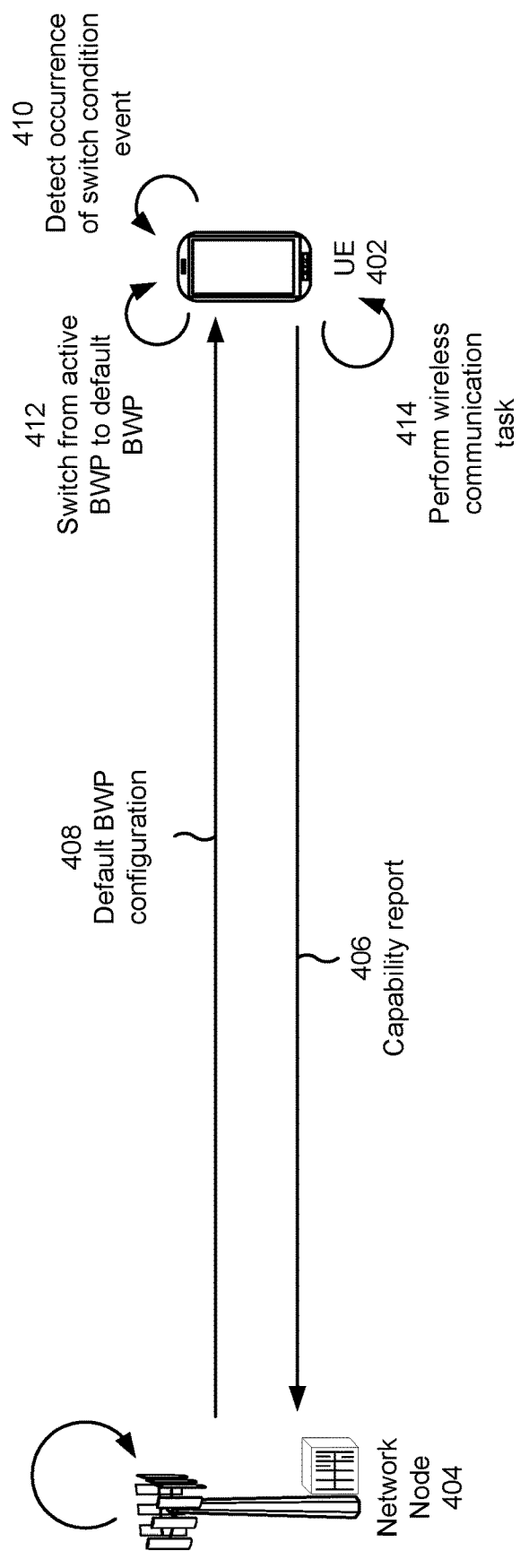
FIG. 4 is a diagram illustrating an example associated with switching from an active bandwidth part to a default bandwidth part, in accordance with the present disclosure.

FIG. 4 is a diagram illustrating an example 400 associated with switching from an active BWP to a default BWP, in accordance with the present disclosure. As shown in FIG. 4, a UE 402 and a network node 404 may communicate with one another. The UE 402 may include a RedCap UE and/or a non-RedCap UE. In some aspects, any number of RedCap UEs and/or non-RedCap UEs may communicate with the network node 404.

As shown by reference number 406, the UE 402 may transmit, and the network node 404 may receive, a capability report. In some aspects, the capability report may indicate one or more capabilities of the UE 402. For example, the one or more capabilities of the UE 402 may include one or more capabilities associated with transmission and reception operations, an indication of whether the UE 402 is a RedCap UE 402, and/or one or more supported BWPs and/or BWP-switching operations, among other examples.

As shown by reference number 408, the network node 404 may transmit, and the UE 402 may receive, a default BWP configuration associated with at least one default BWP. In some aspects, the network node 404 may transmit, and the UE 402 may receive, the default BWP configuration based at least in part on the capability report. In some aspects, the at least one default BWP may include at least one of a downlink default BWP or an uplink default BWP. For example, in some aspects, the at least one default BWP may consist of a downlink default BWP or an uplink default BWP. In some other aspects, the at least one default BWP may include a downlink default BWP and an uplink default BWP.

In some aspects, the default BWP configuration may include a joint configuration of a downlink default BWP and an uplink default BWP. Receiving the joint configuration may include receiving at least one of a system information transmission or a dedicated RRC message in RRC connected state, RRC inactive state, or RRC idle state. For example, the UE 402 may receive the configuration for the default BWP before or during operating on the active BWP. In some aspects, the system information transmission may include at least one of a broadcast signal, a multicast signal, or a unicast signal associated with one or more UE types. In some aspects, for example, the network node 404 may transmit, and the UE 402 may receive a joint configuration transmission, via at least one of a broadcast signal or a multicast signal, within a common frequency resource associated with a UE type reported by the UE 402 (e.g., via the capability report).

In some aspects, the default BWP configuration may include a first configuration associated with a downlink default BWP and a second configuration associated with an uplink default BWP. In some aspects, the downlink default BWP may be aligned with the uplink default BWP at a center frequency associated with a radio resource division duplex mode. The radio resource division duplex mode may include frequency division duplexing (FDD), time division duplexing (TDD), sub-band FDD, and/or in-band full duplex mode, among other examples. In some other aspects, the downlink default BWP may be not aligned with the uplink default BWP at a center frequency associated with a radio resource division duplex mode.

In some aspects, the default BWP may correspond to at least one of a common control resource set (CORESET) and search space set, a synchronization signal, a UE-specific CORESET and search space set, system information, a broadcast signal, a multicast signal, a small data transmission, an SSB configured as a QCL source associated with at least one of a CORESET and search space set within the default BWP, a reference signal configured as a QCL source associated with at least one of a CORESET and search space set within the default BWP, an SSB configured as a spatial relation reference associated with at least one of a RACH occasion or a small data transmission occasion within the default BWP, or a reference signal configured as a spatial relation reference associated with at least one of a RACH occasion or a small data transmission occasion within the default BWP.

As shown by reference number 410, the UE 402 may detect an occurrence of a switch condition event. In some aspects, for example, the UE 402 may detect the occurrence of the switch condition event based at least in part on detecting at least one of an expiration of a BWP inactivity timer, a reception of an RRC reconfiguration, an expiration of a synchronization validity timer, a reception of a system information update, a reception of paging signal, a power headroom status of the UE, a buffer status of the UE, an evaluation for a quality of measurements associated with at least one reference signal, or a switch to another default BWP of at least one pair of linked default BWPs. A pair of linked default BWPs may include a downlink default BWP linked to an uplink default BWP, in which the downlink default BWP and the uplink default BWP share a BWP index. A synchronization validity timer, indicated above, may include a timing advance (TA) timer (for uplink) and/or other downlink/uplink synchronization timers such as a global navigation satellite system (GNSS) fix timer for NTN or sidelink communication.

As shown by reference number 412, the UE 402 may switch from an active BWP to a default BWP of the at least one default BWP. In some aspects, the UE 402 may switch from the active BWP to the default BWP based at least in part on the detection of the occurrence of the switch condition event. In some aspects, the UE 402 may maintain a connected mode during the switching from the active BWP to the default BWP. In some aspects, the UE 402 may switch to an inactive or idle mode during the switching from the active BWP to the default BWP.

As shown by reference number 414, the UE 402 (and/or the network node 404) may perform a wireless communication task based at least in part on the default BWP. For example, in some aspects, the UE 402 may receive, via a downlink default BWP of the at least one default BWP, at least one of a paging signal, a system information update signal, a synchronization signal, a downlink control signal, a reference signal, or a small data transmission from a control plane or a user plan. In some aspects, the UE 402 may transmit, via an uplink default BWP of the at least one default BWP, at least one of a random access channel message, a scheduling request, a buffer status report, or a small data transmission.

In some aspects, the default BWP may correspond to at least one of a PRACH resource, a physical uplink shared channel occasion associated with at least one of a four-step RACH or two-step RACH procedure, a random access based small data transmission, or a configured grant based small data transmission. In some aspects, the UE 402 may be configured to perform one or more complexity reduction procedures based at least in part on the switching from the active BWP to the default BWP, assistance information associated with power saving of the UE or a network node, and UE capabilities. For example, the UE 402 may perform the one or more complexity reduction procedures based at least in part on performing at least one of flushing a hybrid automatic repeat request (HARQ) buffer for the active BWP, reducing a maximum number of HARQ processes, reducing a maximum number of MIMO layers, reducing a maximum bandwidth and max transport block size associated with at least one of downlink communications or uplink communications, reducing a resource size for a physical uplink control channel (PUCCH), relaxing a processing timeline for at least one of a data channel (e.g., a PDSCH and/or a physical uplink shared channel (PUSCH)) or a reference signal (e.g., a CSI-RS, a tracking reference signal (TRS), and/or a positioning reference signal (PRS)), applying a semi-static slot format configured by at least one of system information, a multicast and broadcast signal, a MAC control element (CE), a downlink control signal (e.g., slot information indication carried by a DCI format 2_0), or a radio resource control message.

In some aspects, the UE 402 may perform the one or more complexity reduction procedures based at least in part on performing at least one of switching from a full-duplex mode to a half-duplex mode, switching to a mode of downlink small data transmission or uplink small data transmission, suspending or reducing a duty cycle of obtaining one or more measurements for at least one of an RSRP, an RSRQ, a signal to interference plus noise ratio (SINR), positioning or sensing, suspending or reducing a duty cycle of a measurement reporting, extending a discontinuous reception cycle, skipping a monitoring occasion for a physical downlink control channel, or switching to a different search space set group associated with a reduced number of blind decoding and channel estimation.

As indicated above, FIG. 4 is provided as an example. Other examples may differ from what is described with respect to FIG. 4.

Figure 5:
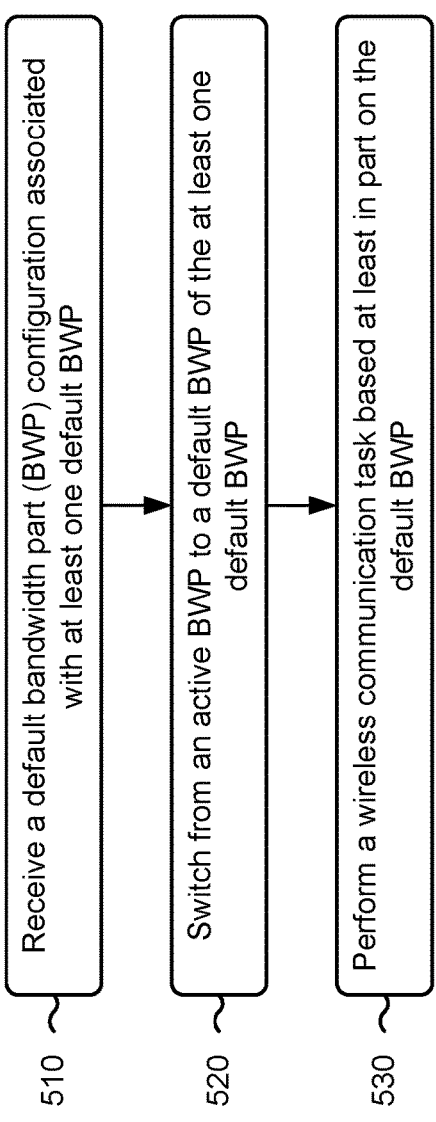
FIGS. 5 and 6 are diagrams illustrating example processes associated with switching from an active bandwidth part to a default bandwidth part, in accordance with the present disclosure.

FIG. 5 is a diagram illustrating an example process 500 performed, for example, by a UE, in accordance with the present disclosure. Example process 500 is an example where the UE (e.g., UE 402) performs operations associated with switching from an active BWP to a default BWP.

As shown in FIG. 5, in some aspects, process 500 may include receiving a default BWP configuration associated with at least one default BWP (block 510). For example, the UE (e.g., using communication manager 140 and/or reception component 702, depicted in FIG. 7) may receive a default BWP configuration associated with at least one default BWP, as described above.

As further shown in FIG. 5, in some aspects, process 500 may include switching from an active BWP to a default BWP of the at least one default BWP (block 520). For example, the UE (e.g., using communication manager 140, reception component 702, and/or transmission component

Figure 7:
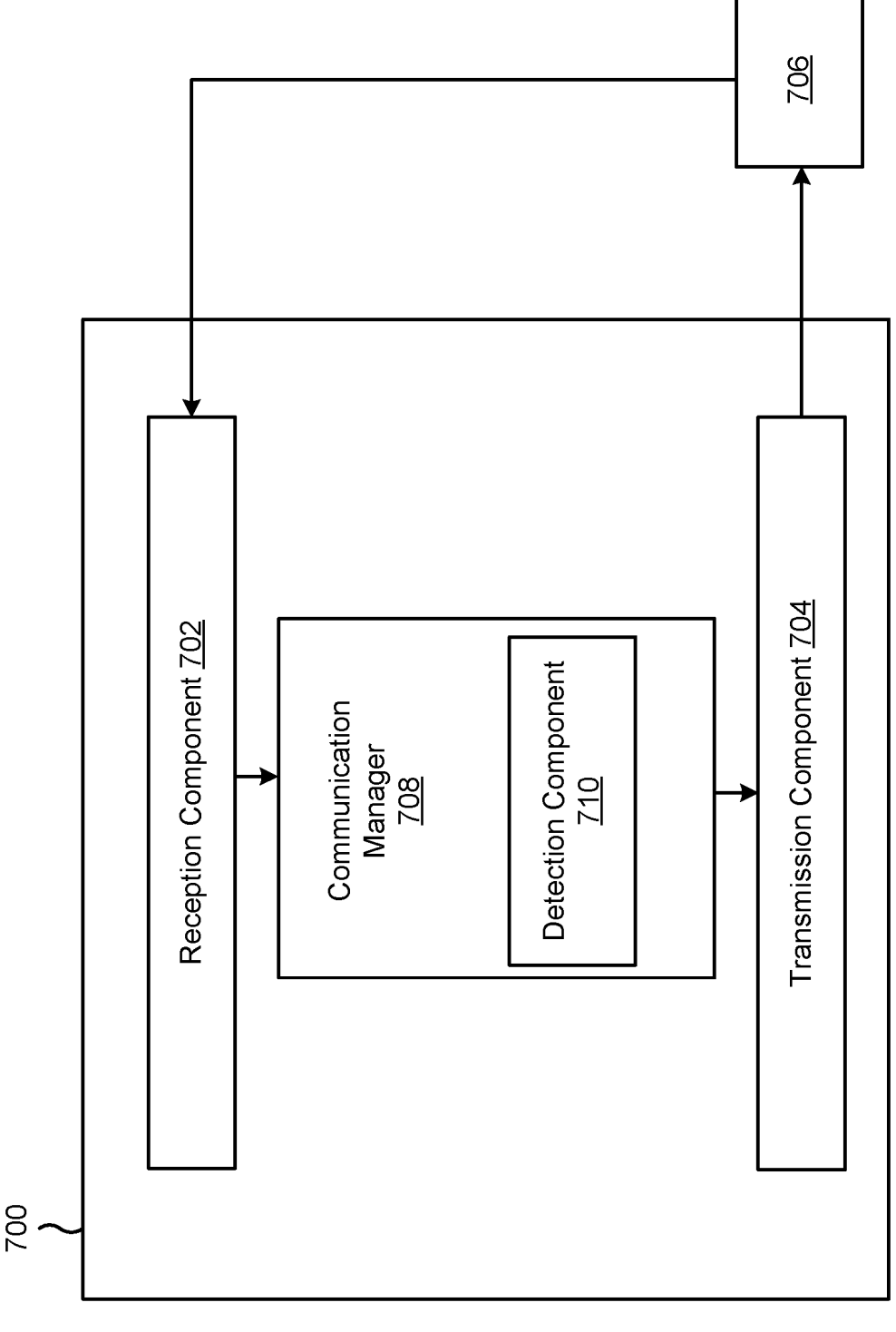
FIGS. 7 and 8 are diagrams of example apparatuses for wireless communication, in accordance with the present disclosure.

704, depicted in FIG. 7) may switch from an active BWP to a default BWP of the at least one default BWP, as described above.

As further shown in FIG. 5, in some aspects, process 500 may include performing a wireless communication task based at least in part on the default BWP (block 530). For example, the UE (e.g., using communication manager 140, reception component 702, and/or transmission component 704, depicted in FIG. 7) may perform a wireless communication task based at least in part on the default BWP, as described above.

Process 500 may include additional aspects, such as any single aspect or any combination of aspects described below and/or in connection with one or more other processes described elsewhere herein.

In some aspects, the at least one default BWP comprises at least one of a downlink default BWP and an uplink default BWP. In some aspects, the default BWP configuration comprises a joint configuration of a downlink default BWP and an uplink default BWP. In some aspects, receiving the joint configuration comprises receiving at least one of a system information transmission or a dedicated radio resource control message in RRC connected state, RRC inactive state, or RRC idle state. In some aspects, the system information transmission comprises at least one of a broadcast signal, a multicast signal, or a unicast signal associated with one or more UE types.

In some aspects, process 500 includes transmitting a capability report that indicates one or more capabilities of the UE, wherein receiving the default BWP configuration comprises receiving the default BWP configuration based at least in part on the capability report. In some aspects, receiving the default BWP configuration comprises receiving a joint configuration transmission, via at least one of a broadcast signal or a multicast signal, within a common frequency resource associated with a UE type reported by the UE. In some aspects, the default BWP configuration comprises a first configuration associated with a downlink default BWP and a second configuration associated with an uplink default BWP.

In some aspects, the downlink default BWP is aligned with the uplink default BWP at a center frequency associated with a radio resource division duplex mode. In some aspects, the downlink default BWP is not aligned with the uplink default BWP at a center frequency associated with a radio resource division duplex mode. In some aspects, the at least one default BWP consists of a downlink default BWP. In some aspects, the at least one default BWP consists of an uplink default BWP.

In some aspects, process 500 includes detecting an occurrence of a switch condition event, wherein the switching from the active BWP to the default BWP comprises switching from the active BWP to the default BWP based at least in part on the detection of the occurrence of the switch condition event. In some aspects, detecting the occurrence of the switch condition event comprises detecting at least one of an expiration of a BWP inactivity timer, a reception of a radio resource control reconfiguration, an expiration of a synchronization validity timer, a reception of a system information update, a reception of paging signal, a power headroom status of the UE, a buffer status of the UE, an evaluation for a quality of measurements associated with at least one reference signal, or a switch to another default BWP of at least one pair of linked default BWPs.

In some aspects, process 500 includes maintaining a connected mode during the switching from the active BWP to the default BWP. In some aspects, process 500 includes switching to an inactive or idle mode during the switching from the active BWP to the default BWP. In some aspects, process 500 includes receiving, via a downlink default BWP of the at least one default BWP, at least one of a paging signal, a system information update signal, a synchronization signal, a downlink control signal, a reference signal, or a small data transmission from a control plane or a user plane.

In some aspects, the default BWP corresponds to at least one of a common CORESET and search space set, a synchronization signal, a UE-specific CORESET and search space set, information, a broadcast signal, a multicast signal, a small data transmission, an SSB configured as a QCL source associated with at least one of a CORESET and search space set within the default BWP, a reference signal configured as a QCL source associated with at least one of a CORESET and search space set within the default BWP, an SSB configured as a spatial relation reference associated with at least one of a RACH occasion or a small data transmission occasion within the default BWP, or a reference signal configured as a spatial relation reference associated with at least one of a RACH occasion or a small data transmission occasion within the default BWP.

In some aspects, process 500 includes transmitting, via an uplink default BWP of the at least one default BWP, at least one of a random access channel message, a scheduling request, a buffer status report, or a small data transmission. In some aspects, the default BWP corresponds to at least one of a PRACH resource, or a physical uplink shared channel occasion associated with at least one of a four-step RACH or two-step RACH procedure, a random access based small data transmission, or a configured grant based small data transmission.

In some aspects, process 500 includes performing one or more complexity reduction procedures based at least in part on the switching from the active BWP to the default BWP, assistance information associated with power saving of the UE or a network node, and UE capabilities. In some aspects, the performing the one or more complexity reduction procedures comprises at least one of flushing a HARQ buffer for the active BWP, reducing a maximum number of HARQ processes, reducing a maximum number of MIMO layers, reducing a maximum bandwidth and max transport block size associated with at least one of downlink communications or uplink communications, reducing a resource size for a PUCCH, relaxing a processing timeline for at least one of a data channel or a reference signal, applying a semi-static slot format configured by at least one of system information, a multicast and broadcast signal, a MAC-CE, a downlink control signal, or a radio resource control message, switching from a full-duplex mode to a half-duplex mode, switching to a mode of downlink small data transmission or uplink small data transmission, suspending or reducing a duty cycle of obtaining one or more measurements for at least one of an RSRP, an RSRQ, an SINR, positioning or sensing, suspending or reducing a duty cycle of a measurement reporting, extending a discontinuous reception cycle, skipping a monitoring occasion for a physical downlink control channel, or switching to a different search space set group associated with a reduced number of blind decoding and channel estimation.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
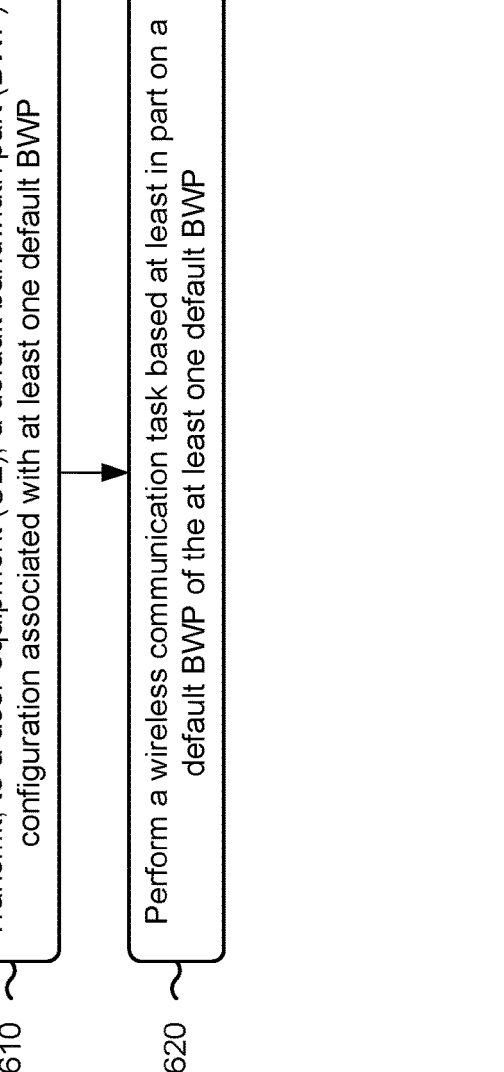

FIG. 6 is a diagram illustrating an example process 600 performed, for example, by a network node, in accordance with the present disclosure. Example process 600 is an example where the network node (e.g., network node 404) performs operations associated with switching from an active BWP to a default BWP.

As shown in FIG. 6, in some aspects, process 600 may include transmitting, to a UE, a default BWP configuration associated with at least one default BWP (block 610). For example, the network node (e.g., using communication manager 808 and/or transmission component 804, depicted in FIG. 8) may transmit, to a UE, a default BWP configuration associated with at least one default BWP, as described above.

As further shown in FIG. 6, in some aspects, process 600 may include performing a wireless communication task based at least in part on a default BWP of the at least one default BWP (block 620). For example, the network node (e.g., using communication manager 808, reception component 802, and/or transmission component 804, depicted in FIG. 8) may perform a wireless communication task based at least in part on a default BWP of the at least one default BWP, as described above.

Process 600 may include additional aspects, such as any single aspect or any combination of aspects described below and/or in connection with one or more other processes described elsewhere herein.

In some aspects, the at least one default BWP comprises at least one of a downlink default BWP and an uplink default BWP. In some aspects, the default BWP configuration comprises a joint configuration of a downlink default BWP and an uplink default BWP. In some aspects, transmitting the joint configuration comprises transmitting at least one of a system information transmission or a dedicated radio resource control message in RRC connected state, RRC inactive state, or RRC idle state. In some aspects, the system information transmission comprises at least one of a broadcast signal, a multicast signal, or a unicast signal associated with one or more UE types.

In some aspects, process 600 includes receiving a capability report that indicates one or more capabilities of the UE, wherein transmitting the default BWP configuration comprises transmitting the default BWP configuration based at least in part on the capability report. In some aspects, transmitting the default BWP configuration comprises transmitting a joint configuration transmission, via at least one of a broadcast signal or a multicast signal, within a common frequency resource associated with a UE type reported by the UE. In some aspects, the default BWP configuration comprises a first configuration associated with a downlink default BWP and a second configuration associated with an uplink default BWP.

In some aspects, the downlink default BWP is aligned with the uplink default BWP at a center frequency associated with a radio resource division duplex mode. In some aspects, the downlink default BWP is not aligned with the uplink default BWP at a center frequency associated with a radio resource division duplex mode. In some aspects, the at least one default BWP consists of a downlink default BWP. In some aspects, the at least one default BWP consists of an uplink default BWP. In some aspects, the default BWP configuration further comprises a switch condition event for causing the UE to switch from an active BWP to the default BWP. In some aspects, a detection the occurrence of the switch condition event comprises a detection at least one of an expiration of a BWP inactivity timer, a reception of a radio resource control reconfiguration, an expiration of a synchronization validity timer, a reception of a system information update, a reception of paging signal, a power headroom status of the UE, a buffer status of the UE, an evaluation for a quality of measurements associated with at least one reference signal, or a switch to another default BWP of at least one pair of linked default BWPs.

In some aspects, process 600 includes transmitting, via a downlink default BWP of the at least one default BWP, at least one of a paging signal, a system information update signal, a synchronization signal, a downlink control signal, a reference signal, or a small data transmission from a control plane or a user plane. In some aspects, the default BWP corresponds to at least one of a common CORESET and search space set, a synchronization signal, a UE-specific CORESET and search space set, information, a broadcast signal, a multicast signal, a small data transmission, an SSB configured as a QCL source associated with at least one of a CORESET and search space set within the default BWP, a reference signal configured as a QCL source associated with at least one of a CORESET and search space set within the default BWP, an SSB configured as a spatial relation reference associated with at least one of a RACH occasion or a small data transmission occasion within the default BWP, or a reference signal configured as a spatial relation reference associated with at least one of a RACH occasion or a small data transmission occasion within the default BWP.

In some aspects, process 600 includes receiving, via an uplink default BWP of the at least one default BWP, at least one of a random access channel message, a scheduling request, a buffer status report, or a small data transmission. In some aspects, the default BWP corresponds to at least one of a PRACH resource, or a physical uplink shared channel occasion associated with at least one of a four-step RACH or two-step RACH procedure, a random access based small data transmission, or a configured grant based small data transmission.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include a communication manager 708. The communication manager 708 may include a detection component 710.

In some aspects, the apparatus 700 may be configured to perform one or more operations described herein in connection with FIG. 4. Additionally, or alternatively, the apparatus 700 may be configured to perform one or more processes described herein, such as process 500 of FIG. 5. In some aspects, the apparatus 700 and/or one or more components shown in FIG. 7 may include one or more components of the UE described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 700. In some aspects, the reception component 702 may include one or more antennas, a modem, a demodulator, a MIMO detector, a receive processor, a controller/processor, a memory, or a combination thereof, of the UE described in connection with FIG. 2.

The transmission component 704 may transmit communications, such as reference signals, control information, data communications, or a combination thereof, to the apparatus 706. In some aspects, one or more other components of the apparatus 700 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the UE described in connection with FIG. 2. In some aspects, the transmission component 704 may be co-located with the reception component 702 in a transceiver.

The reception component 702 may receive a default BWP configuration associated with at least one default BWP. The communication manager 708, the reception component 702, and/or the transmission component 704, may switch from an active BWP to a default BWP of the at least one default BWP. In some aspects, the communication manager 708 may include one or more antennas, a modem, a controller/processor, a memory, or a combination thereof, of the UE described in connection with FIG. 2. In some aspects, the communication manager 708 may be, be similar to, include, or be included in, the communication manager 140, depicted in FIGS. 1 and 2. In some aspects, the communication manager 708 may include the reception component 702 and/or the transmission component 704.

The communication manager 708, the reception component 702, and/or the transmission component 704 may perform a wireless communication task based at least in part on the default BWP. The transmission component 704 may transmit a capability report that indicates one or more capabilities of the UE, wherein receiving the default BWP configuration comprises receiving the default BWP configuration based at least in part on the capability report.

The detection component 710 may detect an occurrence of a switch condition event, wherein the switching from the active BWP to the default BWP comprises switching from the active BWP to the default BWP based at least in part on the detection of the occurrence of the switch condition event. In some aspects, the detection component 710 may include one or more antennas, a modem, a controller/processor, a memory, or a combination thereof, of the UE described in connection with FIG. 2. In some aspects, the detection component 710 may include the reception component 702 and/or the transmission component 704. The communication manager 708, the reception component 702, and/or the transmission component 704 may maintain a connected mode during the switching from the active BWP to the default BWP. The communication manager 708, the reception component 702, and/or the transmission component 704 may switch to an inactive or idle mode during the switching from the active BWP to the default BWP.

The reception component 702 may receive, via a downlink default BWP of the at least one default BWP, at least one of a paging signal, a system information update signal, a synchronization signal, a downlink control signal, a reference signal, or a small data transmission from a control plane or a user plane. The transmission component 704 may transmit, via an uplink default BWP of the at least one default BWP, at least one of a random access channel message, a scheduling request, a buffer status report, or a small data transmission. The communication manager 708, the reception component 702, and/or the transmission component 704 may perform one or more complexity reduction procedures based at least in part on the switching from the active BWP to the default BWP, assistance information associated with power saving of the UE or a network node, and UE capabilities.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
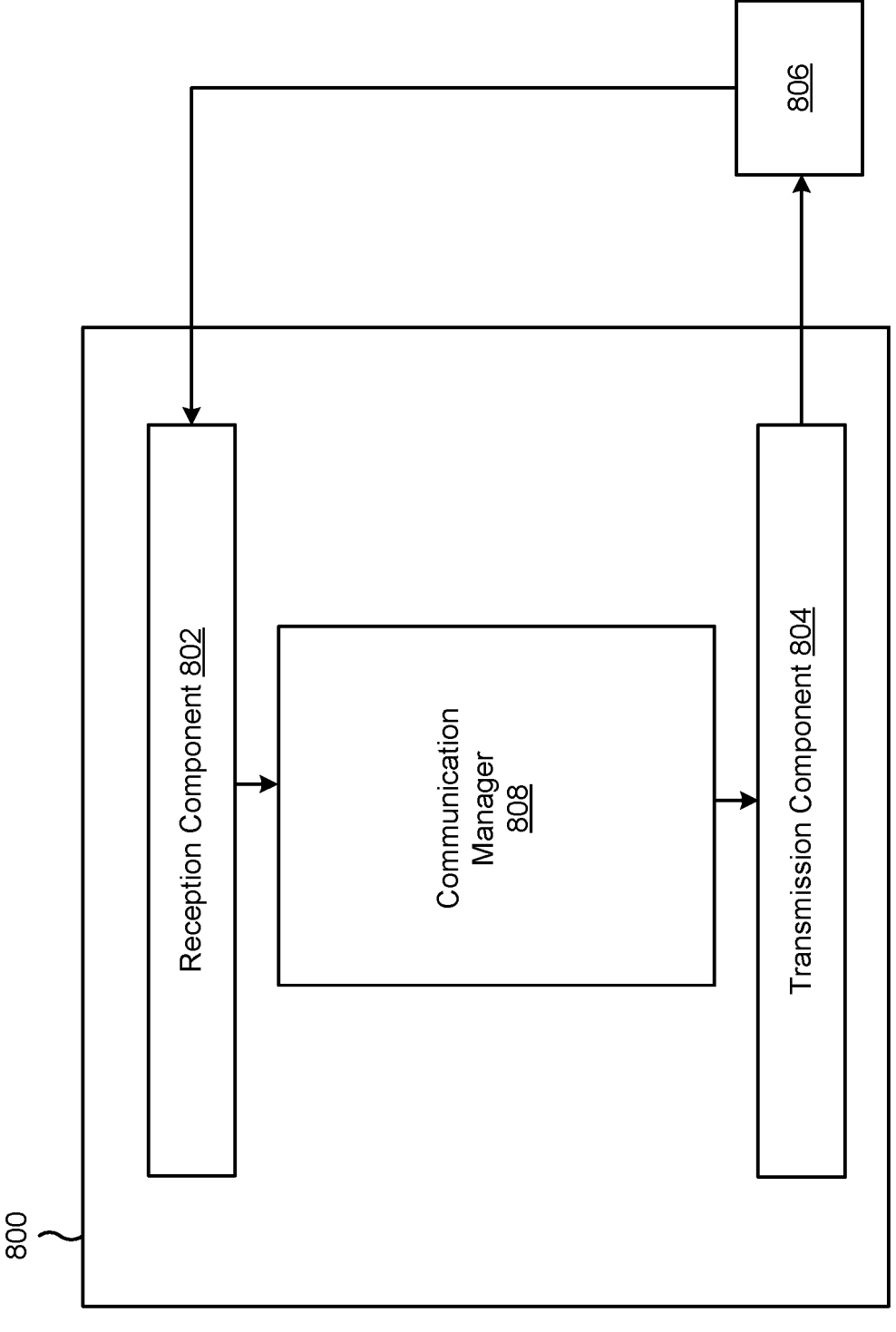

FIG. 8 is a diagram of an example apparatus 800 for wireless communication. The apparatus 800 may be a network node, or a network node may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a communication manager 808.

In some aspects, the apparatus 800 may be configured to perform one or more operations described herein in connection with FIG. 4. Additionally, or alternatively, the apparatus 800 may be configured to perform one or more processes described herein, such as process 600 of FIG. 6. In some aspects, the apparatus 800 and/or one or more components shown in FIG. 8 may include one or more components of the network node described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the network node described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the network node described in connection with FIG. 2. In some aspects, the transmission component 804 may be co-located with the reception component 802 in a transceiver.

The transmission component 804 may transmit, to a UE, a default BWP configuration associated with at least one default BWP. The communication manager 808, the reception component 802, and/or the transmission component 804, may perform a wireless communication task based at least in part on a default BWP of the at least one default BWP. In some aspects, the communication manager 808 may include one or more antennas, a modem, a controller/processor, a memory, or a combination thereof, of the UE described in connection with FIG. 2. In some aspects, the communication manager 808 may be, be similar to, include, or be included in, the communication manager 150, depicted in FIGS. 1 and 2. In some aspects, the communication manager 808 may include the reception component 802 and/or the transmission component 804.

The reception component 802 may receive a capability report that indicates one or more capabilities of the UE, wherein transmitting the default BWP configuration comprises transmitting the default BWP configuration based at least in part on the capability report. The transmission component 804 may transmit, via a downlink default BWP of the at least one default BWP, at least one of a paging signal, a system information update signal, a synchronization signal, a downlink control signal, a reference signal, or a small data transmission from a control plane or a user plane. The reception component 802 may receive, via an uplink default BWP of the at least one default BWP, at least one of a random access channel message, a scheduling request, a buffer status report, or a small data transmission.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a user equipment (UE), comprising: receiving a default bandwidth part (BWP) configuration associated with at least one default BWP; switching from an active BWP to a default BWP of the at least one default BWP; and performing a wireless communication task based at least in part on the default BWP.

Aspect 2: The method of Aspect 1, wherein the at least one default BWP comprises at least one of a downlink default BWP and an uplink default BWP.

Aspect 3: The method of either of Aspects 1 or 2, wherein the default BWP configuration comprises a joint configuration of a downlink default BWP and an uplink default BWP.

Aspect 4: The method of Aspect 3, wherein receiving the joint configuration comprises receiving at least one of a system information transmission or a dedicated radio resource control message in radio resource control (RRC) connected state, RRC inactive state, or RRC idle state.

Aspect 5: The method of Aspect 4, wherein the system information transmission comprises at least one of a broadcast signal, a multicast signal, or a unicast signal associated with one or more UE types.

Aspect 6: The method of any of Aspects 1-5, further comprising transmitting a capability report that indicates one or more capabilities of the UE, wherein receiving the default BWP configuration comprises receiving the default BWP configuration based at least in part on the capability report.

Aspect 7: The method of any of Aspects 1-6, wherein receiving the default BWP configuration comprises receiving a joint configuration transmission, via at least one of a broadcast signal or a multicast signal, within a common frequency resource associated with a UE type reported by the UE.

Aspect 8: The method of any of Aspects 1-7, wherein the default BWP configuration comprises a first configuration associated with a downlink default BWP and a second configuration associated with an uplink default BWP.

Aspect 9: The method of Aspect 8, wherein the downlink default BWP is aligned with the uplink default BWP at a center frequency associated with a radio resource division duplex mode.

Aspect 10: The method of either of Aspects 8 or 9, wherein the downlink default BWP is not aligned with the uplink default BWP at a center frequency associated with a radio resource division duplex mode.

Aspect 11: The method of any of Aspects 1-10, wherein the at least one default BWP consists of a downlink default BWP.

Aspect 12: The method of any of Aspects 1-10, wherein the at least one default BWP consists of an uplink default BWP.

Aspect 13: The method of any of Aspects 1-12, further comprising detecting an occurrence of a switch condition event, wherein the switching from the active BWP to the default BWP comprises switching from the active BWP to the default BWP based at least in part on the detection of the occurrence of the switch condition event.

Aspect 14: The method of Aspect 13, wherein detecting the occurrence of the switch condition event comprises detecting at least one of: an expiration of a BWP inactivity timer, a reception of a radio resource control reconfiguration, an expiration of a synchronization validity timer, a reception of a system information update, a reception of paging signal, a power headroom status of the UE, a buffer status of the UE, an evaluation for a quality of measurements associated with at least one reference signal, or a switch to another default BWP of at least one pair of linked default BWPs.

Aspect 15: The method of any of Aspects 1-14, further comprising maintaining a connected mode during the switching from the active BWP to the default BWP.

Aspect 16: The method of any of Aspects 1-14, further comprising switching to an inactive or idle mode during the switching from the active BWP to the default BWP.

Aspect 17: The method of any of Aspects 1-16, further comprising receiving, via a downlink default BWP of the at least one default BWP, at least one of a paging signal, a system information update signal, a synchronization signal, a downlink control signal, a reference signal, or a small data transmission from a control plane or a user plane.

Aspect 18: The method of any of Aspects 1-17, wherein the default BWP corresponds to at least one of: a common control resource set (CORESET) and search space set, a synchronization signal, a UE-specific CORESET and search space set, system information, a broadcast signal, a multicast signal, a small data transmission, a synchronization signal block (SSB) configured as a quasi-colocation (QCL) source associated with at least one of a CORESET and search space set within the default BWP, a reference signal configured as a QCL source associated with at least one of a CORESET and search space set within the default BWP, an SSB configured as a spatial relation reference associated with at least one of a random access channel (RACH) occasion or a small data transmission occasion within the default BWP, or a reference signal configured as a spatial relation reference associated with at least one of a RACH occasion or a small data transmission occasion within the default BWP.

Aspect 19: The method of any of Aspects 1-18, further comprising transmitting, via an uplink default BWP of the at least one default BWP, at least one of a random access channel message, a scheduling request, a buffer status report, or a small data transmission.

Aspect 20: The method of any of Aspects 1-19, wherein the default BWP corresponds to at least one of: a physical random access channel (PRACH) resource, or a physical uplink shared channel occasion associated with at least one of a four-step RACH or two-step RACH procedure, a random access based small data transmission, or a configured grant based small data transmission.

Aspect 21: The method of any of Aspects 1-20, further comprising performing one or more complexity reduction procedures based at least in part on the switching from the active BWP to the default BWP, assistance information associated with power saving of the UE or a network node, and UE capabilities.

Aspect 22: The method of Aspect 21, wherein the performing the one or more complexity reduction procedures comprises at least one of: flushing a hybrid automatic repeat request (HARQ) buffer for the active BWP, reducing a maximum number of HARQ processes, reducing a maximum number of multi-input and multi-out (MIMO) layers, reducing a maximum bandwidth and max transport block size associated with at least one of downlink communications or uplink communications, reducing a resource size for a physical uplink control channel (PUCCH), relaxing a processing timeline for at least one of a data channel or a reference signal, applying a semi-static slot format configured by at least one of system information, a multicast and broadcast signal, a MAC-CE, a downlink control signal, or a radio resource control message, switching from a full-duplex mode to a half-duplex mode, switching to a mode of downlink small data transmission or uplink small data transmission, suspending or reducing a duty cycle of obtaining one or more measurements for at least one of a reference signal received power (RSRP), a reference signal received quality (RSRQ), a signal to interference plus noise ratio (SINR), positioning or sensing, suspending or reducing a duty cycle of a measurement reporting, extending a discontinuous reception cycle, skipping a monitoring occasion for a physical downlink control channel, or switching to a different search space set group associated with a reduced number of blind decoding and channel estimation.

Aspect 23: A method of wireless communication performed by a network node, comprising: transmitting, to a user equipment (UE), a default bandwidth part (BWP) configuration associated with at least one default BWP; and performing a wireless communication task based at least in part on a default BWP of the at least one default BWP.

Aspect 24: The method of Aspect 23, wherein the at least one default BWP comprises at least one of a downlink default BWP and an uplink default BWP.

Aspect 25: The method of either of Aspects 23 or 24, wherein the default BWP configuration comprises a joint configuration of a downlink default BWP and an uplink default BWP.

Aspect 26: The method of Aspect 25, wherein transmitting the joint configuration comprises transmitting at least one of a system information transmission or a dedicated radio resource control message in radio resource control (RRC) connected state, RRC inactive state, or RRC idle state.

Aspect 27: The method of Aspect 26, wherein the system information transmission comprises at least one of a broadcast signal, a multicast signal, or a unicast signal associated with one or more UE types.

Aspect 28: The method of any of Aspects 23-27, further comprising receiving a capability report that indicates one or more capabilities of the UE, wherein transmitting the default BWP configuration comprises transmitting the default BWP configuration based at least in part on the capability report.

Aspect 29: The method of any of Aspects 23-27, wherein transmitting the default BWP configuration comprises transmitting a joint configuration transmission, via at least one of a broadcast signal or a multicast signal, within a common frequency resource associated with a UE type reported by the UE.

Aspect 30: The method of any of Aspects 23-29, wherein the default BWP configuration comprises a first configuration associated with a downlink default BWP and a second configuration associated with an uplink default BWP.

Aspect 31: The method of Aspect 30, wherein the downlink default BWP is aligned with the uplink default BWP at a center frequency associated with a radio resource division duplex mode.

Aspect 32: The method of Aspect 30, wherein the downlink default BWP is not aligned with the uplink default BWP at a center frequency associated with a radio resource division duplex mode.

Aspect 33: The method of any of Aspects 23-32, wherein the at least one default BWP consists of a downlink default BWP.

Aspect 34: The method of any of Aspects 23-32, wherein the at least one default BWP consists of an uplink default BWP.

Aspect 35: The method of any of Aspects 23-34, wherein the default BWP configuration further comprises a switch condition event for causing the UE to switch from an active BWP to the default BWP.

Aspect 36: The method of Aspect 35, wherein a detection the occurrence of the switch condition event comprises a detection at least one of: an expiration of a BWP inactivity timer, a reception of a radio resource control reconfiguration, an expiration of a synchronization validity timer, a reception of a system information update, a reception of paging signal, a power headroom status of the UE, a buffer status of the UE, an evaluation for a quality of measurements associated with at least one reference signal, or a switch to another default BWP of at least one pair of linked default BWPs.

Aspect 37: The method of any of Aspects 23-36, further comprising transmitting, via a downlink default BWP of the at least one default BWP, at least one of a paging signal, a system information update signal, a synchronization signal, a downlink control signal, a reference signal, or a small data transmission from a control plane or a user plane.

Aspect 38: The method of any of Aspects 23-37, wherein the default BWP corresponds to at least one of: a common control resource set (CORESET) and search space set, a synchronization signal, a UE-specific CORESET and search space set, system information, a broadcast signal, a multicast signal, a small data transmission, a synchronization signal block (SSB) configured as a quasi-colocation (QCL) source associated with at least one of a CORESET and search space set within the default BWP, a reference signal configured as a QCL source associated with at least one of a CORESET and search space set within the default BWP, an SSB configured as a spatial relation reference associated with at least one of a random access channel (RACH) occasion or a small data transmission occasion within the default BWP, or a reference signal configured as a spatial relation reference associated with at least one of a RACH occasion or a small data transmission occasion within the default BWP.

Aspect 39: The method of any of Aspects 23-38, further comprising receiving, via an uplink default BWP of the at least one default BWP, at least one of a random access channel message, a scheduling request, a buffer status report, or a small data transmission.

Aspect 40: The method of any of Aspects 23-39, wherein the default BWP corresponds to at least one of: a physical random access channel (PRACH) resource, or a physical uplink shared channel occasion associated with at least one of a four-step RACH or two-step RACH procedure, a random access based small data transmission, or a configured grant based small data transmission.

Aspect 41: An apparatus for wireless communication at a device, comprising a processor; memory coupled with the processor; and instructions stored in the memory and executable by the processor to cause the apparatus to perform the method of one or more of Aspects 1-22.

Aspect 42: A device for wireless communication, comprising memory, and one or more processors coupled to the memory, the memory comprising instructions executable by the one or more processors to cause the device to perform the method of one or more of Aspects 1-22.

Aspect 43: A device for wireless communication, comprising a memory and one or more processors coupled to the memory, the one or more processors configured to perform the method of one or more of Aspects 1-22.

Aspect 44: An apparatus for wireless communication, comprising at least one means for performing the method of one or more of Aspects 1-22.

Aspect 45: A non-transitory computer-readable medium storing code for wireless communication, the code comprising instructions executable by a processor to perform the method of one or more of Aspects 1-22.

Aspect 46: A non-transitory computer-readable medium storing a set of instructions for wireless communication, the set of instructions comprising one or more instructions that, when executed by one or more processors of a device, cause the device to perform the method of one or more of Aspects 1-22.

Aspect 47: An apparatus for wireless communication at a device, comprising a processor; memory coupled with the processor; and instructions stored in the memory and executable by the processor to cause the apparatus to perform the method of one or more of Aspects 23-40.

Aspect 48: A device for wireless communication, comprising memory, and one or more processors coupled to the memory, the memory comprising instructions executable by the one or more processors to cause the device to perform the method of one or more of Aspects 23-40.

Aspect 49: A device for wireless communication, comprising a memory and one or more processors coupled to the memory, the one or more processors configured to perform the method of one or more of Aspects 23-40.

Aspect 50: An apparatus for wireless communication, comprising at least one means for performing the method of one or more of Aspects 23-40.

Aspect 51: A non-transitory computer-readable medium storing code for wireless communication, the code comprising instructions executable by a processor to perform the method of one or more of Aspects 23-40.

Aspect 52: A non-transitory computer-readable medium storing a set of instructions for wireless communication, the set of instructions comprising one or more instructions that, when executed by one or more processors of a device, cause the device to perform the method of one or more of Aspects 23-40.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

one or more memories; and one or more processors coupled to the one or more memories, the one or more memories storing instructions configurable to be executed by the one or more processors to cause the UE to:

transmit a capability report that indicates whether the UE is a reduced capacity UE;

receive a default bandwidth part (BWP) configuration, associated with at least one default BWP, based at least in part on the capability report, wherein the at least one default BWP is used for:
    communicating a small data transmission, or
    performing a random access channel (RACH) procedure;
detect an occurrence of a switch condition event, wherein the switch condition event comprises at least one of:
    an expiration of a synchronization validity timer;
    a power headroom status of the UE; or
    an evaluation for a quality of measurements associated with at least one reference signal;
switch from an active BWP to a default BWP of the at least one default BWP based at least in part on detection of the occurrence of the switch condition event; and
perform a wireless communication task based at least in part on the default BWP.

2. The UE of claim 1, wherein the at least one default BWP comprises at least one of a downlink default BWP or an uplink default BWP.

3. The UE of claim 1, wherein the default BWP configuration comprises a joint configuration of a downlink default BWP and an uplink default BWP.

4. The UE of claim 3, wherein the instructions configurable to be executed, when receiving the joint configuration, are further executable by the one or more processors to cause the UE to receive a system information transmission or a dedicated radio resource control (RRC) message, the system information transmission or the dedicated RRC message being received in an RRC connected state, an RRC inactive state, or an RRC idle state.

5. The UE of claim 4, wherein the system information transmission comprises at least one of a broadcast signal, a multicast signal, or a unicast signal associated with one or more UE types.

6. The UE of claim 1, wherein the capability report indicates one or more capabilities of the UE.

7. The UE of claim 1, wherein the instructions configurable to be executed, when receiving the default BWP configuration, are further executable by the one or more processors to cause the UE to receive a joint configuration transmission, via at least one of a broadcast signal or a multicast signal, within a common frequency resource associated with a UE type reported by the UE.

8. The UE of claim 1, wherein the default BWP configuration comprises a first configuration associated with a downlink default BWP and a second configuration associated with an uplink default BWP.

9. The UE of claim 8, wherein the downlink default BWP is aligned with the uplink default BWP at a center frequency associated with a radio resource division duplex mode.

10. The UE of claim 8, wherein the downlink default BWP is not aligned with the uplink default BWP at a center frequency associated with a radio resource division duplex mode.

11. The UE of claim 1, wherein the at least one default BWP consists of a downlink default BWP.

12. The UE of claim 1, wherein the at least one default BWP consists of an uplink default BWP.

13. The UE of claim 1, wherein the instructions configurable to be executed, when detecting the occurrence of the switch condition event, are further executable by the one or more processors to cause the UE to detect at least one of:
    an expiration of a BWP inactivity timer,
    a reception of a radio resource control reconfiguration,
    a reception of a system information update,
    a reception of paging signal, a buffer status of the UE, or
    a switch to another default BWP of at least one pair of linked default BWPs.

14. The UE of claim 1, wherein the one or more memories further store instructions configurable to be executed by the one or more processors to cause the UE to maintain a connected mode during the switching from the active BWP to the default BWP.

15. The UE of claim 1, wherein the one or more memories further store instructions configurable to be executed by the one or more processors to cause the UE to switch to an inactive or idle mode during the switching from the active BWP to the default BWP.

16. The UE of claim 1, wherein the one or more memories further store instructions configurable to be executed by the one or more processors to cause the UE to receive, via a downlink default BWP of the at least one default BWP, at least one of a paging signal, a system information update signal, a synchronization signal, a downlink control signal, a reference signal, or a small data transmission from a control plane or a user plane.

17. The UE of claim 1, wherein the default BWP corresponds to at least one of:
    receiving paging,
    receiving system information,
    a common control resource set (CORESET) and search space set,
    a synchronization signal,
    a UE-specific CORESET and search space set,
    a broadcast signal,
    a multicast signal,
    a synchronization signal block (SSB) configured as a quasi-colocation (QCL) source associated with at least one of a CORESET or search space set within the default BWP,
    a reference signal configured as a QCL source associated with at least one of a CORESET or search space set within the default BWP,
    an SSB configured as a spatial relation reference associated with at least one of a RACH occasion or a small data transmission occasion within the default BWP, or
    a reference signal configured as a spatial relation reference associated with at least one of a RACH occasion or a small data transmission occasion within the default BWP.

18. The UE of claim 1, wherein the one or more memories further store instructions configurable to be executed by the one or more processors to cause the UE to transmit, via an uplink default BWP of the at least one default BWP, at least one of a random access channel message, a scheduling request, a buffer status report, or a small data transmission.

19. The UE of claim 1, wherein the default BWP corresponds to at least one of:
    a physical random access channel (PRACH) resource, or
    a physical uplink shared channel occasion associated with at least one of a four-step RACH or two-step RACH procedure, a random access based small data transmission, or a configured grant based small data transmission.

20. The UE of claim 1, wherein the one or more memories further store instructions configurable to be executed by the one or more processors to cause the UE to perform one or more complexity reduction procedures based at least in part on:
    the switching from the active BWP to the default BWP,
    assistance information associated with power saving of the UE or a network node, and UE capabilities of the UE.

21. The UE of claim 20, wherein the performing the one or more complexity reduction procedures comprises at least one of:

flush a hybrid automatic repeat request (HARQ) buffer for the active BWP, reduce a maximum number of HARQ processes, reduce a maximum number of multi-input and multi-out (MIMO) layers, reduce a maximum bandwidth and max transport block size associated with at least one of downlink communications or uplink communications, reduce a resource size for a physical uplink control channel (PUCCH), relax a processing timeline for at least one of a data channel or a reference signal, apply a semi-static slot format configured by at least one of system information, a multicast and broadcast signal, a medium access control (MAC) control element (CE), a downlink control signal, or a radio resource control message, switch from a full-duplex mode to a half-duplex mode, switch to a mode of downlink small data transmission or uplink small data transmission, suspend or reduce a duty cycle of obtaining one or more measurements for at least one of a reference signal received power (RSRP), a reference signal received quality (RSRQ), a signal to interference plus noise ratio (SINR), positioning, or sensing, suspend or reducing a duty cycle of a measurement reporting, extend a discontinuous reception cycle, skip a monitoring occasion for a physical downlink control channel, or switch to a different search space set group associated with a reduced number of blind decoding and channel estimation.

22. A network node for wireless communication, comprising:

one or more memories; and one or more processors coupled to the one or more memories, the one or more memories storing instructions configurable to be executed by the one or more processors to cause the network node to:

receive a capability report that indicates whether a user equipment (UE) is a reduced capacity UE, wherein the capability report indicates one or more bandwidth part (BWP)-switching operations supported by the UE, the one or more BWP-switching operations associated with a switch condition event, wherein the switch condition event comprises at least one of:
        an expiration of a synchronization validity timer;
        a power headroom status of the UE; or
        an evaluation for a quality of measurements associated with at least one reference signal;

transmit, to the UE, a default BWP configuration, associated with at least one default BWP, based at least in part on the capability report, wherein the at least one default BWP is used for:
        communicating a small data transmission, or
        performing a random access channel (RACH) procedure; and perform a wireless communication task based at least in part on a default BWP of the at least one default BWP.

23. The network node of claim 22, wherein the at least one default BWP comprises at least one of a downlink default BWP or an uplink default BWP.

24. The network node of claim 22, wherein the default BWP configuration comprises a joint configuration of a downlink default BWP and an uplink default BWP.

25. The network node of claim 22, wherein the instructions configurable to be executed, when transmitting the default BWP configuration, are further executable by the one or more processors to cause the network node to transmit a joint configuration transmission, via at least one of a broadcast signal or a multicast signal, within a common frequency resource associated with a UE type reported by the UE.

26. A method of wireless communication performed by a user equipment (UE), comprising:

transmitting a capability report that indicates whether the UE is a reduced capacity UE;

receiving a default bandwidth part (BWP) configuration, associated with at least one default BWP, based at least in part on the capability report, wherein the at least one default BWP is used for:
    communicating a small data transmission, or
    performing a random access channel (RACH) procedure;

detecting an occurrence of a switch condition event, wherein the switch condition event comprises at least one of:
    an expiration of a synchronization validity timer;
    a power headroom status of the UE; or
    an evaluation for a quality of measurements associated with at least one reference signal;

switching from an active BWP to a default BWP of the at least one default BWP based at least in part on detecting the occurrence of the switch condition event; and performing a wireless communication task based at least in part on the default BWP.

27. The method of claim 26, wherein the at least one default BWP comprises at least one of a downlink default BWP or an uplink default BWP.

28. The method of claim 26, wherein the default BWP configuration comprises a joint configuration of a downlink default BWP and an uplink default BWP.

29. A method of wireless communication performed by a network node, comprising:

receiving a capability report that indicates whether a user equipment (UE) is a reduced capacity UE, wherein the capability report indicates one or more bandwidth part (BWP)-switching operations supported by the UE, the one or more BWP-switching operations associated with a switch condition event, wherein the switch condition event comprises at least one of:
    an expiration of a synchronization validity timer;
    a power headroom status of the UE; or
    an evaluation for a quality of measurements associated with at least one reference signal;

transmitting, to the UE, a default BWP configuration, associated with at least one default BWP, based at least in part on the capability report, wherein the at least one default BWP is used for:
    communicating a small data transmission, or
    performing a random access channel (RACH) procedure; and performing a wireless communication task based at least in part on a default BWP of the at least one default BWP.

30. The method of claim 29, wherein the at least one default BWP comprises at least one of a downlink default BWP or an uplink default BWP.

* * * * *